Aug. 9, 1966  W. R. DICKIE  3,265,408
EXPLOSIVELY SEPARABLE COUPLING
Filed Nov. 6, 1961  2 Sheets-Sheet 1
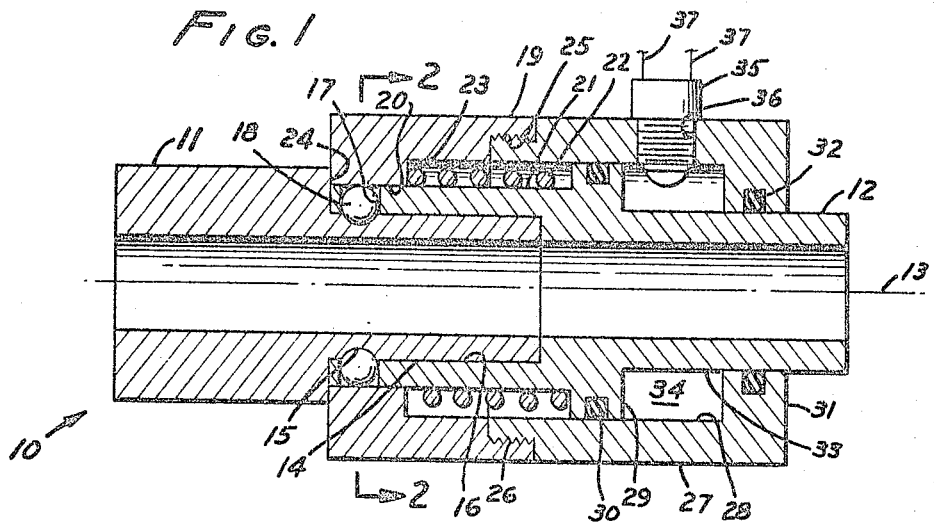
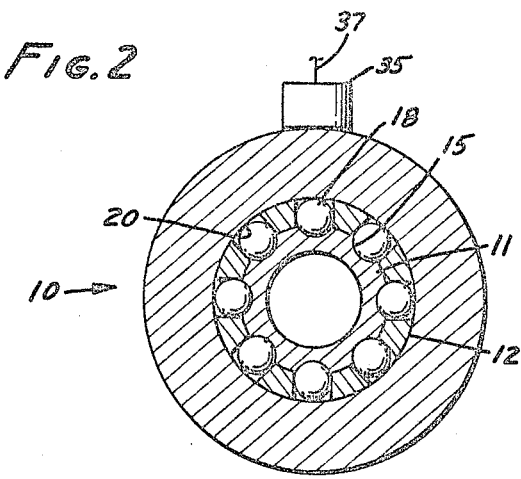
INVENTOR.
WILLIAM R. DICKIE
BY Angus & Mon
ATTORNEYS.

Aug. 9, 1966     W. R. DICKIE     3,265,408
EXPLOSIVELY SEPARABLE COUPLING
Filed Nov. 6, 1961     2 Sheets-Sheet 2
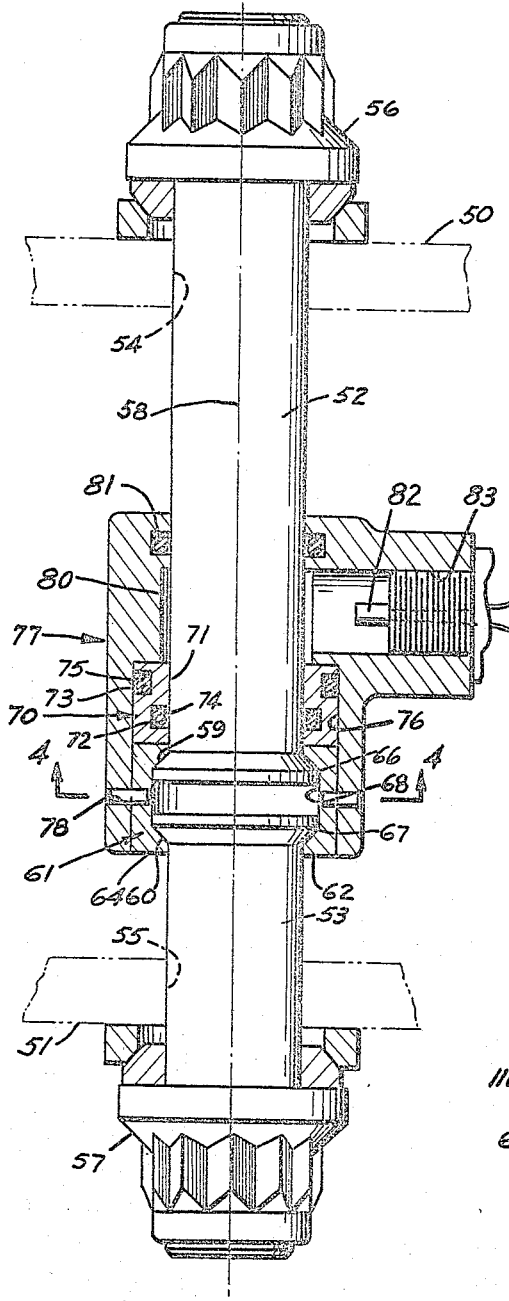
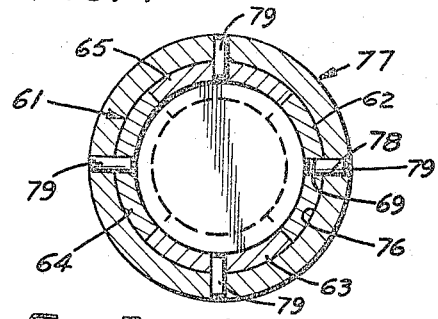
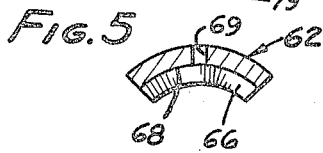
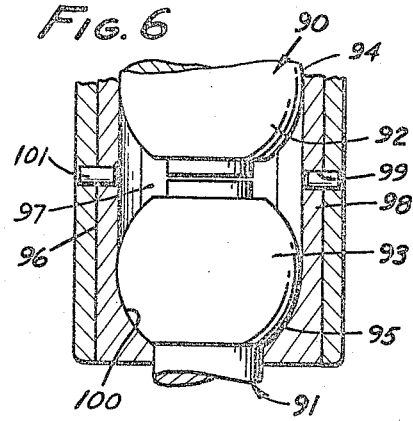
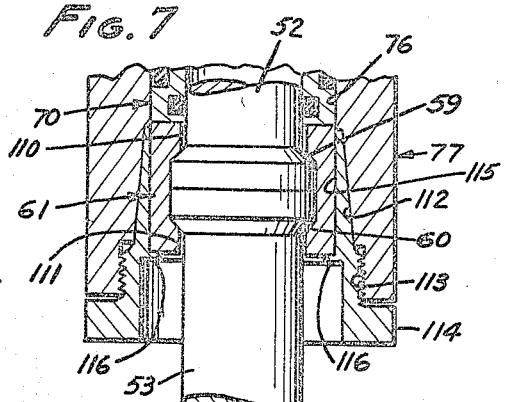
INVENTOR.
WILLIAM R. DICKIE
BY Angus & Mon
ATTORNEYS.

United States Patent Office 3,265,408
Patented August 9, 1966

3,265,408
EXPLOSIVELY SEPARABLE COUPLING
William R. Dickie, Manhattan Beach, Calif., assignor to Hi-Shear Corporation, Torrance, Calif., a corporation of California
Filed Nov. 6, 1961, Ser. No. 150,307
6 Claims. (Cl. 285—3)

This is a continuation-in-part of application Serial No. 84,943, filed Jan. 25, 1961, now abandoned, entitled "Quick-Release Coupling," which is assigned to the same assignee as the present application.

This invention relates to a quick-release coupling.

In couplings for applications such as electrical disconnect plugs, hydraulic hose connections, and tension and compression couplings in general, or the like, it is frequently required to provide means for holding two members together, which means can quickly be disengaged for effecting a quick decoupling of the members. There exist a number of conventional devices for this purpose which utilize springs or fluid pressure to shift a latch means for accomplishing a decoupling action. Probably the most convenient of such means utilizes fluid pressure. However, such devices have not hitherto been entirely successful because of the manner in which the fluid had to be provided. For example, one technique utilizes fuel pressure or compressed air pressure actually piped to the coupling. This involves the disadvantage that the piping has weight which ought to be minimized for airborne and missile applications, and also that it requires connections which are subject to leakage and which therefore requires attention and many often require repair.

It is an object of this invention to provide a quick-release coupling adapted to be actuated by fluid pressure, wherein the pressure is supplied from a unit contained in the coupling itself. By such means, the release of actuating fluid can be effectuated by means such as firing a squib, which requires no more than light conductive lead wires, thereby eliminating any need for providing or maintaining at the coupling fluid under pressure derived from other systems.

A quick-release coupling according to this invention comprises a first and second member which are to be coupled together. Each member has a central axis, which axes are aligned when the members are coupled. Engagement means are provided on each member which are engageable by a lock which restrains the engegement means. A latch is provided for reliably holding the lock to the engagement means, and holding means are provided to hold the latch in a positon securing the lock until the coupling is to be parted. An expansible chamber means is at least partially bounded by the latch means. A squib of the type which releases gas under pressure is placed in fluid communication with the expansible chamber means. Actuating the squib will discharge gas into the expansible chamber means, and the resulting expansion of the chamber will serve to move the latch to overcome the holding means and disengage the latch from the lock, thereby releasing the engagement means and permitting the members to separate.

According to a preferred but optional feature of the invention, the squib is an explosive type which discharges gases formed by explosion into the expansible chamber means.

According to still another preferred but optional feature of the invention, the expansible chamber means comprises a piston and a cylinder, one of which is integral with the latch, and the other of which is restrained relative to the members, both surrounding and being concentric with the axis of the members. The cylinder slides to move the latch means when the squib discharges gas under pressure into the cylinder.

The above and other features of this invention will be fully understood from the following detailed description and the accompanying drawings in which:

FIG. 1 is a cross-section of one embodiment of the invention;
FIG. 2 is a cross-section taken at line 2—2 of FIG. 1;
FIG. 3 is a side elevation, partly in cutaway cross-section, showing another embodiment of the invention;
FIG. 4 is a cross-section taken at line 4—4 of FIG. 3;
FIG. 5 is another cross-section taken at line 4—4, but eliminating certain parts;
FIG. 6 is a fragmentary side elevation, partly in cutaway cross-section, showing still another embodiment of the invention; and
FIG. 7 is a fragmentary side elevation, partly in cutaway cross-section, showing the presently preferred embodiment of the invention.

The quick-release coupling 10 shown in FIGS. 1 and 2 includes a first member 11 and a second member 12 which are to be coupled together. The embodiment shown accomplishes the coupling of two pipes. It is to be understood that this coupling will function for its intended purpose without reference to the nature of the members which it joins together. Instead of pipes, it could as well be used to make connectons between electrical terminal plug assemblies or in any other application wherein two members are to be joined together and later released to be parted.

The members have central axes which are coincident when joined, axis 13 being common to both of them when they are coupled as shown. First member 11 has a tubular nipple 14 with a plurality of ball detents 15 (sometimes called "engagement means") in its outer surface. This nipple is adapted to fit into a bore 16 in second member 12. Fluid sealing means (not shown) may be provided between the two members if desired. Second member 12 has near its left-hand end a plurality of ball cages 17 (sometimes called "engagement means") which are of lesser thickness than the diameter of a plurality of balls 18, (the balls sometimes being called "lock") one of which fits in each of the cages. A latch 19 has a cylindrical inner latching surface 20 adapted to slide along a matching outer surface 21 on the second member to a position overlaying the ball cages. The latch, when it backs up the balls, forces the balls into the detents. The radial distance between surface 20 and the bottom of the ball detent is substantially equal to the diameter of the balls, which causes the balls to act as locks and join the engagement means.

A coil spring 22 (sometimes called "holding means") bears against a shoulder 23 on the latch. It biases the latch toward and against a shoulder 24 on first member 11 and normally holds the latch in the locking position illustrated in FIG. 1.

The latch has a set of interior threads 25 which make threaded engagement with exterior threads 26 on a cylinder 27. The cylinder has a smooth cylindrical surface 28 which is slidable on a piston 29 that is formed integral with the second member. An O-ring 30 makes a sliding seal between the piston and the cylinder. The cylinder has an internally projecting flange 31 which carries an O-ring 32 that makes a sliding seal with an exterior cylindrical surface 33 on the second member. It will thereby be seen that the cylinder and the piston form expansible chamber means by forming an expansible chamber 34 between them, and that the expansible chamber means is attached to, and at least partially bounded by, the latch, whereby shifting of the latch by moving the cylinder to the right relative to the piston will free the balls from the ball detents and permit the members to part.

The above-described movement is intended to be accomplished by introduction of fluid, preferably a gas under pressure, into the expansible chamber. This gas is preferably supplied by an explosive squib 35 threaded into a hole 36 which extends through the wall of the cylinder. Electrical leads 37 are provided for conducting current to detonate the squib. The squib is of the class which, when actuated (detonated), releases gases under pressure. An example of a suitable squib is one manufactured by Hi-Shear Corporation, Torrance, California, under the designation, Hi-Shear Corporation, part No. PC10. This squib is suitable for all embodiments.

FIG. 4 shows another embodimnt of the invention, in which a pair of rod members are joined in tension. The coupling is shown holding together two plates 50, 51. Rod members 52, 53 pass through holes 54, 55 in the plates. Nuts 56, 57 are threaded onto the rod members to tighten the assembly.

Rod members 52, 53 have coincidental axes 58, and conical shoulders 59, 60, respectively. These shoulders are sometimes called "engagement means." They slope in opposite directions.

A lock 61 comprises four identical segments 62–65. Segment 62 is typical of all of them and is best shown in FIGS. 3–5. It includes a pair of shoulders 66, 67, each of which is a fragment of a conical frustum. These shoulders face toward each other. Their larger diameters are spaced apart far enough by a cylindrical section 68 to accommodate both engagement means. A hole 69 extends radially through the segment at the cylindrical portion. The segments are assembled into a ring, each segment forming about a 90° portion thereof.

A sealing gland 70 has a central opening 71 and an internal and external ring groove 72, 73, respectively, The ring grooves hold sealing rings 74, 75, respectively. Internal ring 74 seals with member 52, and external ring 75 seals with the internal wall of a cylinder 76.

Cylinder 76 forms part of a latch 77. Four holes 78 pass through the wall of cylinder 76, and are aligned with holes 69. Holding means 79, which comprise shear pins pressed into aligned ones of holes 69 and 78, hold the engagement means, lock, and latch together.

The latch at least partially encloses an expansion chamber 80. Sealing ring 81 closes the upper end, and gland 70 seals the lower end. A squib 82 is threaded into a port 83 in fluid communication with the expansion chamber. That part of member 52 which is engaged by ring 81 is cylindrical.

FIG. 6 shows the device of FIG. 3 with differently shaped lock and engagement means. Members 90 and 91 have ball-like ends 92 and 93 with engagement means 94 and 95, respectively. The engagement means are zones of spheres. There is a lock with four segments of which three, 96, 97, 98, are shown, four of which together form a ring. Each has a hole 99 therethrough as in FIG. 3. Two identical shoulders face each other inside the segments, of which only one is shown in each segment, for example, shoulder 100 on segment 96. Holding means in the form of shear pins 101 join the latch and lock as in FIG. 3. Shoulders 100 are spherical zones which match the engagement means. The ball ends and lock illustrated modify FIG. 3 to take swaged AN type ball ends, and indicates how the lock in any embodiment can be adapted to handle different shapes and types of engagement rings.

FIG. 7 shows the presently preferred embodiment of the invention. It is adapted to hold members in both compressive and tensile aplications, while the embodiments of FIGS. 3–6 are adapted only for tensile applications. Where there are parts in common with the structure of FIG. 3, identical numerals are used to identify them.

Members 52 and 53 with their engagement means 59, 60 are held together by a lock 61. The lock segments are identical to those of FIG. 3, except that hole 69 may be deleted, and that clearances 110 and 111 are formed between the segments and members 52 and 53.

Sealing gland 70 seals between member 52 and cylinder 76. Above the cutoff portion of FIG. 7, the structure is identical to that of FIG. 3.

Latch 77 is internally relieved at 112 and threaded at 113. A nut 114 having an internal cylindrical wall 115 is threaded into the latch. Cylindrical wall 115 forms a continuation of cylinder 76. Holding means 116 comprises four shear tabs adapted to be bent out of the way when the device is separated, but which serves to hold the latch and lock together until then.

The operation of the device of FIG. 1 should be evident from the drawings. To couple the members, the latch is moved to the right off the balls so that the nipple can be inserted into bore 16. (The balls may be kept from falling out of the holes when the latch is withdrawn by well-known caging techniques which need not be shown here.) Then the latch is released, and the spring moves the latch to the left, forcing the balls into the detents. The coupling is then held firmly assembled. To release the coupling, current is passed through leads 37 to detonate the squip which introduces gas under pressure into chamber 34, moving the latch to the right off the balls, freeing the balls from the detents, and enabling the members to separate. Depending on the type of installation, it may be desirable to provide springs or other means to force the members apart once the latch means is released, but this is not essential to the invention, and its nature would depend on the type of installation involved.

The operation of the device of FIG. 3 is as follows. Ordinarily the two members 52, 53 are assembled together before being applied to their next assemblies. This initial assembly is performed by sliding the sealing gland and the latch over the upper end of member 52 and assembling the segments around the engagement means. Then the latch is forced down over the segments, and the shear pins are pressed through the aligned holes. The members 52, 53 are thereby held together. Then the next assemblies may be attached to the members by passing them through the members and tightening down the nuts.

When the members are to be separated, the squib is fired which introduces fluid under pressure into the expansion chamber. The sealing gland presses against the segments so that there is a direct opposition between the latch and the segments applying shear forces to pins 79. As soon as sufficient pressure has built up in the expansion chamber, the pins will shear and the latch will move upward relative to the segments, ultimately moving off of them, permitting the segments to fall off of the engagement means, thereby freeing the members 52 and 53 from each other.

The assembly and operation of FIG. 6 is identical to that of FIG. 3, FIG. 6 merely illustrating that different configurations of engagement means are possible with the invention.

The assembly of FIG. 7 is somewhat simpler than that of FIG. 3. The sealing gland and latch are placed on members 52 as above, and the segments are assembled around the engagement means. Then the nut is threaded into the latch with its tabs serving as holding means to hold the segments assembled.

Attention is called to clearances 110 and 111. The purposes of these clearances is to be certain that the outer cylindrical walls of the engagement means can always reach the cylindrical sidewall of the segments which can be held to close enough dimensions that the ends of members 52 and 53 can always meet. By providing this clearance, assurance is given that the members will bottom in the segments without interference from the segments. There will then be a sufficient squeeze that the members will be brought together firmly so that the device can function in compression as well as tension.

When this device is to be separated, the squib is fired as in FIG. 3 and the same relative motion of latch and segments occurs, the holding means comprising the tabs shearing or bending, or acting in a combination of these two movements, to permit the latch to fly off the segments. The segments then drop off, and the members separate.

Instead of an explosive squib, it is possible to utilize other types of devices, which can also properly be denoted as squibs in the sense that a fluid is self-contained at a point of use, and is suddenly released such as, for example, by provision of a $CO_2$ cartridge and a point for puncturing the same. This is a squib in the same sense as the explosive squib, because both devices quickly release gases from a self-contained source which is in fluid communication with the expansible chamber.

This invention thereby provides useful couplings which are reliable and self-contained, except for small light weight actuating leads.

The term "latch" is intended to comprehend any means for locking two members together as a function of the position of a slidable member whose position is shiftable by a pressure condition in an expansible chamber to which the latch means is interconnected, and such a latch could include bars, posts, toggles, pawls, and the like, as well as balls or locking segments.

This invention is not to be limited by the embodiments shown in the drawings and described in the description which are given by way of example and not of limitation, but only in accordance with the appended claims.

I claim:

1. A quick-release coupling comprising: a first and a second member to be coupled together, each member having a central axis, the axes being aligned when the members are coupled; engagement means comprising a shoulder on each of the members; a lock for interconnecting the engagement means, and thereby interconnecting the members, comprising a plurality of segments adapted to be assembled into a ring, each of said segments having a pair of opposed shoulders adapted to engage the engagement means to hold them together; a reciprocable latch carried by one of the members and engageable with the lock by surrounding and embracing the segments in a first position of the latch so as to hold the segments against the engagement means, and said latch being shiftable to a second position to remove it from said segments; expansible chamber means at least partially enclosed by the latch; means on opposite ends of said chamber adapted to seal said latch with one of said members; a squib of the type which discharges gas under pressure disposed in fluid connection with the expansible chamber means, said squib being mounted to the coupling and adapted to discharge said gas into the expansible chamber means to shift the latch from the first to the second position; and frangible holding means holding the latch and lock together until the squib discharges the gas under pressure to shift the latch from the first to the second position.

2. A quick-release coupling according to claim 1 in which the holding means comprises a shear pin interconnecting the latch and lock.

3. A quick-release coupling according to claim 1 in which the holding means comprises a tab on the latch, holding the segments within the latch, said tab being adapted to be removed from the path of the segments when the latch is moved from its first to its second position.

4. A quick-release coupling according to claim 1 in which each of the segments is provided with a substantially cylindrical portion interconnecting its two shoulders and with a pair of openings on opposite sides of said shoulders from the cylindrical portion, the said openings, when the segments are assembled in a ring, having an outer diameter greater than the adjacent diameter of the member.

5. A coupling according to claim 1 in which the expansible chamber comprises a piston formed on one of said members, and a slidable cylinder fitted over said piston for axial movement, the latch means being connected to the cylinder.

6. A coupling according to claim 1 in which the squib is an explosive squib actuated by passage of electric current through electrical leads.

References Cited by the Examiner
UNITED STATES PATENTS

| | | | |
|---|---|---|---|
| 2,166,412 | 7/1939 | Kiesel | 285—2 |
| 2,421,807 | 6/1947 | Richey. | |
| 2,643,140 | 6/1953 | Scheiwer | 285—316 |
| 2,809,584 | 10/1957 | Smith | 285—2 |
| 2,921,436 | 1/1960 | Canner | 285—18 |
| 2,956,820 | 10/1960 | DeCenzo | 285—233 |
| 2,996,316 | 8/1961 | Terhune | 285—4 |
| 3,032,356 | 5/1962 | Botsford | 285—18 |
| 3,119,298 | 1/1964 | Brown | 285—2 |

CARL W. TOMLIN, *Primary Examiner.*

EDWARD C. ALLEN, THOMAS F. CALLAGHAN,
*Examiners.*